(12) United States Patent
Brown, Jr. et al.

(10) Patent No.: US 8,684,278 B2
(45) Date of Patent: Apr. 1, 2014

(54) TRACTION JACK

(75) Inventors: Jeffrey Brown, Jr., El Paso, TX (US); Carlos Amaro, El Paso, TX (US)

(73) Assignee: Traction Jack, LLC, Albuquerque, NM (US)

( * ) Notice: Subject to any disclaimer, the term of this patent is extended or adjusted under 35 U.S.C. 154(b) by 172 days.

(21) Appl. No.: 13/362,652

(22) Filed: Jan. 31, 2012

(65) Prior Publication Data

US 2012/0193439 A1 Aug. 2, 2012

Related U.S. Application Data

(60) Provisional application No. 61/438,322, filed on Feb. 1, 2011, provisional application No. 61/534,674, filed on Oct. 6, 2011.

(51) Int. Cl.
*E01B 23/00* (2006.01)

(52) U.S. Cl.
USPC .......................................................... 238/14

(58) Field of Classification Search
USPC .................................. 238/10 R, 14; 291/1, 2
See application file for complete search history.

(56) References Cited

U.S. PATENT DOCUMENTS

| | | | |
|---|---|---|---|
| 2,227,750 A | 9/1939 | Hinson | |
| 3,708,117 A | 1/1973 | Coale | |
| 3,858,803 A | 1/1975 | Gantert | |
| 4,300,722 A | 11/1981 | Simmons | |
| 4,461,456 A * | 7/1984 | Munna | 254/88 |
| 5,402,941 A | 4/1995 | MacLeod | |
| 5,855,359 A * | 1/1999 | Chipperfield | 254/88 |
| 6,045,122 A * | 4/2000 | Torres | 254/88 |
| 6,119,634 A * | 9/2000 | Myrick | 119/847 |
| 6,314,602 B1 | 11/2001 | Wallen | |
| 6,520,420 B1 | 2/2003 | Singh | |
| 6,779,738 B1 | 8/2004 | Stannard | |
| 7,003,836 B2 | 2/2006 | Berg | |
| 7,043,789 B2 * | 5/2006 | Morrish | 14/69.5 |
| 7,350,719 B1 | 4/2008 | Brenner | |
| 7,404,524 B2 | 7/2008 | Mathieu | |
| 7,526,826 B2 * | 5/2009 | Bailie | 14/69.5 |
| 2003/0213072 A1* | 11/2003 | Myrick et al. | 14/69.5 |
| 2007/0234491 A1 | 10/2007 | Bailie | |
| 2009/0300859 A1 | 12/2009 | Lucht | |
| 2012/0012663 A1 | 1/2012 | Studstill | |

* cited by examiner

*Primary Examiner* — R. J. McCarry, Jr.
(74) *Attorney, Agent, or Firm* — Melissa Silverstein; Luis M. Ortiz; Kermit D. Lopez (57) ABSTRACT

A vehicle traction jack that functions as a traction mat platform, ramp, and vehicle jack to assist a vehicle's tire when a tire is stuck in a rut, hole, or some sort of terrain or weather condition such as sand, gravel, dirt, mud, or snow is disclosed. The traction jack comprises a first plate and second plate, a hinge assembly, and a jack. The first and second plates can extend to a partially-opened or fully-opened position, forming a ramp and traction mat platform. The extended traction jack can be placed in front of or behind a vehicle's tire to provide addition traction. A jack extends from at least one plate of the vehicle traction jack to raise a vehicle for repairs to the vehicle's tire. Easily stored in a vehicle at all times, a single user can use the traction jack to help move any type of vehicle's tire.

20 Claims, 8 Drawing Sheets

TRACTION JACK

CROSS REFERENCE TO RELATED APPLICATIONS

This patent application claims the priority and benefit under 35 U.S.C. §119(e) of U.S. Provisional Patent Application Ser. No. 61/438,322 filed on Feb. 1, 2011, and entitled "Traction Jack," and which is incorporated herein by reference in its entirety. This patent application claims the priority and benefit under 35 U.S.C. §119(e) of U.S. Provisional Patent Application Ser. No. 61/534,674 filed on Sep. 14, 2011, and entitled "Traction Jack," and which is incorporated herein by reference in its entirety.

TECHNICAL HELD

The disclosed embodiments relate to traction devices. The disclosed embodiments further relate to techniques for providing additional traction for a vehicle's tires for removal from loose terrain or adverse weather conditions. The disclosed embodiments also relate to a vehicle ramp and jack for raising a vehicle for repair.

BACKGROUND OF THE INVENTION

Various devices have been developed for improving traction between a vehicle's tires and a road surface made slippery by adverse weather or inferior roadbed conditions such as ice, snow, mud, and desert sand. Proposed traction devices help a vehicle drive out of a rut or pothole by gaining additional traction from materials placed in the path of the tires. Such traction aids include boards, burlap bags, pieces of carpeting, tire chains, and various bulky ramps, for example. These makeshift means are generally ineffective when caught and thrown out by the rotating tires. Typically, a standard block of wood is used with the assistance of numerous people to free off-roaders in desert terrain, which often leads to damaged tires and vehicles.

Other traction devices are prohibitively expensive to purchase and unsafe to handle because of sharp edges and heavy components. Prior traction mats are often difficult to position beneath the vehicle's tires for use. When a vehicle's tires become mired in snow, mud, or desert sand for some depth, the resulting ruts formed by the vehicle's tires are often deep and steeply sloping. Flexible traction mats tend to closely conform to steeply sloping was of a rut or may sink in various road conditions, making it difficult for a vehicle to climb out under its own power. When a prior traction mat is used to extricate a vehicle from such an environment, the tire frequently engages and slides against the leading or front edge of the mat without gaining a satisfactory grip.

A motorist may want access to a variety of vehicle tools without having to store numerous devices in the vehicle. While traction mats and other aids such as jacks and repair ramps can be carried in a vehicle, they fight for storage space with other items. Manual and automated vehicle jacks are usually carried in a vehicle and used principally to assist a motorist with changing a vehicle's tire. A manual jack that attaches to the bumper or frame of vehicle at designated points is a widely used method of jacking or lifting a vehicle. After placement, a manual jack is usually cranked to lift the vehicle and repair a desired tire. An all-in-one traction jack device needs to save the motorist time and effort by helping the tires to regain traction for return to the roadway and to eliminate the high cost of an emergency road service truck for winching the stranded vehicle from a slippery hole or rut.

Accordingly, there exists a need for an effective, space-saving vehicle traction jack device that provides additional traction and a ramped surface to lend traction to move a vehicle's tires when the tires are stuck in loose terrain or weather conditions.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore an object of the disclosed embodiments to provide a space-saving vehicle traction and jack device.

It is another object of the disclosed embodiments to provide a ramped-surface to assist a vehicle's tires when the tires are stuck in loose terrain or adverse weather conditions.

It is an additional object of the disclosed embodiments to provide an all-in-one vehicle traction surface, ramp, and jack for raising a vehicle for repair.

The above and other aspects can be achieved as is now described. A vehicle traction jack that functions as a traction mat platform, ramp, and vehicle jack to assist a vehicle's tire when a tire is stuck in a rut, hole, or some sort of terrain or weather condition, such as sand, gravel, dirt, mud, or snow is disclosed. The traction jack comprises a first plate and second plate, a hinge assembly, and a jack. The first and second plates can extend to a partially-opened or fully-opened position, forming a ramp and traction mat platform. The extended traction jack can be placed in front of or behind a vehicle's tire to provide additional traction. A jack extends from at least one plate of the vehicle traction jack to raise a vehicle for repairs to the vehicle's tire. Easily stored in a vehicle at all times, a single user can use the traction jack to help move any type of vehicle's tire.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a" "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
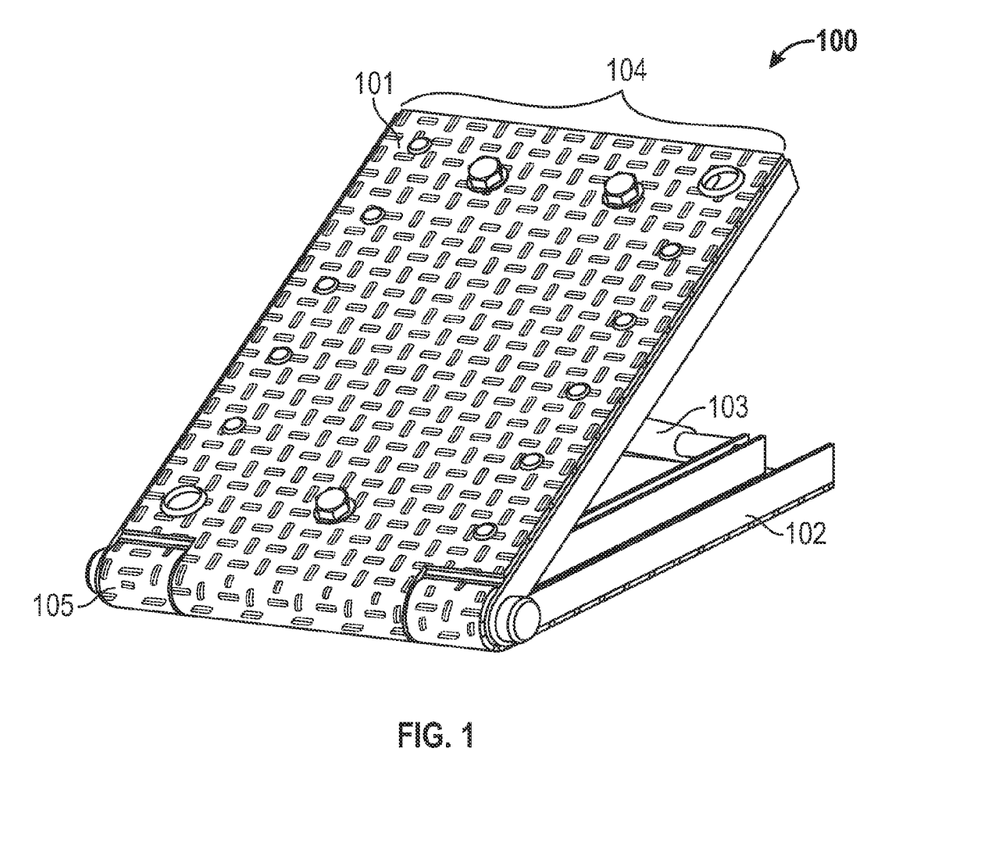
FIG. 1 illustrates an exemplary perspective view of the traction jack in a partially opened position, in accordance with the disclosed embodiments.

FIG. 1 illustrates an exemplary perspective view 100 of the traction jack in a partially opened position, in accordance with the disclosed embodiments. The traction jack functions as a combination traction mat platform, ramp, and vehicle jack to assist a vehicle's tire when a tire is stuck in a rut, hole, a roadway surface, or some sort of terrain or weather condition such as sand, gravel, dirt, mud, or snow, for example. The traction jack comprises a first plate 101 and second plate 102, a rounded edge 105, and a jack 103. The first plate 101 is a rigid and rectangular surface capable of withstanding the weight of a vehicle. The first plate 101 is covered in an anti-slip, high traction surface 104 such as, for example, recycled tire tread, corrugated metal, or any type of adhered abrasive material to lend additional traction, but is not limited to those items. The high traction surface 104 can completely cover the first plate 101 or can be arranged in strips or cover portions of the first plate 101, for example. The second plate 102 is a rigid, rectangular surface of the same size and material construction of the first plate 101. The second plate 102 is also covered in an anti-slip, high traction surface 104. The high traction surface 104 can completely cover the second plate 102 or can be arranged in strips or cover portions of the second plate 102, for example. The high traction surface 104 possesses high coefficients of static friction for frictional engagement with a vehicle's tire.

The first plate 101 and second plate 102 can be constructed of metal such as, for example, steel or aluminum, but is not limited solely to these types of materials. The vehicle traction jack 100 is appropriately sized to receive and lift any size vehicle tire. For example, an exemplary first plate 101 and an exemplary second plate 102 of the vehicle traction jack 100 can measure approximately ten to twelve inches wide and approximately two feet long. The vehicle traction jack 100 can be sized to receive larger, after-market tires, with an exemplary first plate 101 and an exemplary second plate 102 measuring approximately twelve inches wide by sixteen inches long. It is understood that all dimensions of the first plate 101 and the second plate 102 are provided for illustrative purposes only and do not limit the disclosed embodiments to those particular dimensions.

Figure 2:
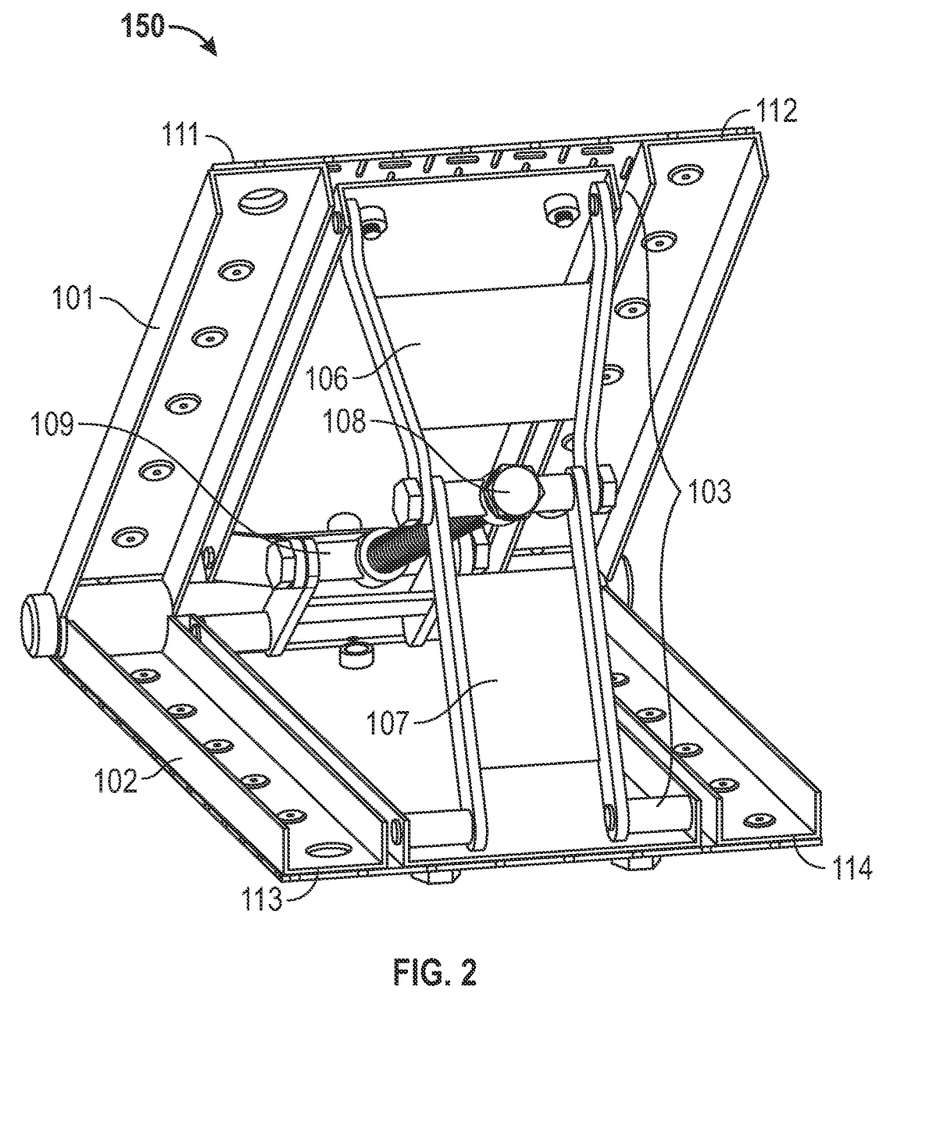
FIG. 2 illustrates an exemplary perspective view of the traction jack in a partially opened position, in accordance with the disclosed embodiments.

FIG. 2 illustrates an exemplary perspective view 150 of the traction jack in a partially opened position, in accordance with the disclosed embodiments. Underside of the first plate 101 has two channels 111, 112 to receive two channels 113, 114 on the underside of the second plate 102. The hinge assembly can comprise a jack 103. The jack 103 can be, for example, a bottle jack, a telescoping jack, a floor jack, or any type of a hydraulic jack. The jack 103 has a first extendable member 106 and a second extendable member 107. The first extendable member 106 connects to the first plate 101 and the jack knob 108. The second extendable member 107 connects to the second plate 102 and the jack knob 108. The jack knob 108 connects to the jack hinge assembly 109. The hinge assembly 109 provides the first plate 101 and the second plate 102 with a full rotational range of motion and articulated adjustability for positioning the traction jack 150 between a tire and a surface. The hinge assembly allows the first plate 101 and second plate 102 to open to a partially opened position (e.g., less than 180°) and a fully opened position (e.g., greater than or equal to 180°). The hinge assembly allows the traction jack to be folded into a closed position, or to one half of its fully opened length, for easy transport and storage.

Figure 3:
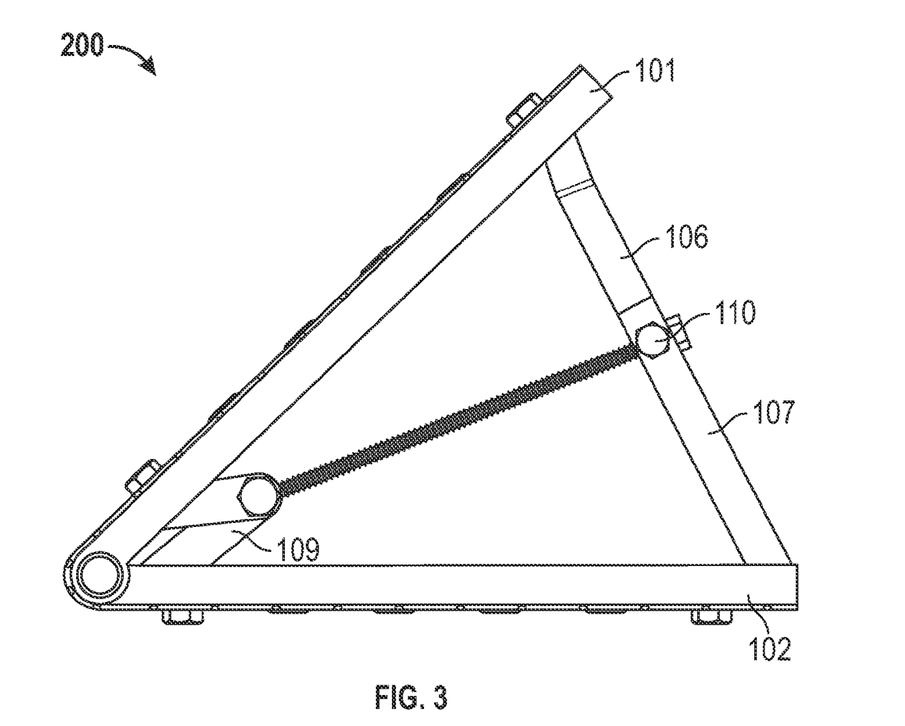
FIG. 3 illustrates an exemplary side elevation view of the traction jack in a partially opened position, in accordance with the disclosed embodiments.

FIG. 3 illustrates an exemplary side elevation view 200 of the traction jack in a partially opened position, in accordance with the disclosed embodiments. The first plate 101 is extended to a 45° angle using the jack hinge assembly 109. Bolt 110 connects the first extendable member 106 to the second extendable member 107. A vehicle can be driven up onto the partially-opened vehicle traction jack illustrated in FIG. 3 when the jack 103 is used to create a ramp. The height of the ramp is controlled by the user extending the jack 103. The appropriately-sized first plate 101 and second plate 102 supports the vehicle for repairs underneath the vehicle and/or to the vehicle's tire. The hinge assembly comprises at least one hinge member and the hinge member's attachments that connect the first plate 101 and second plate 102 along a shorter side of each plate 101, 102.

Figure 4:
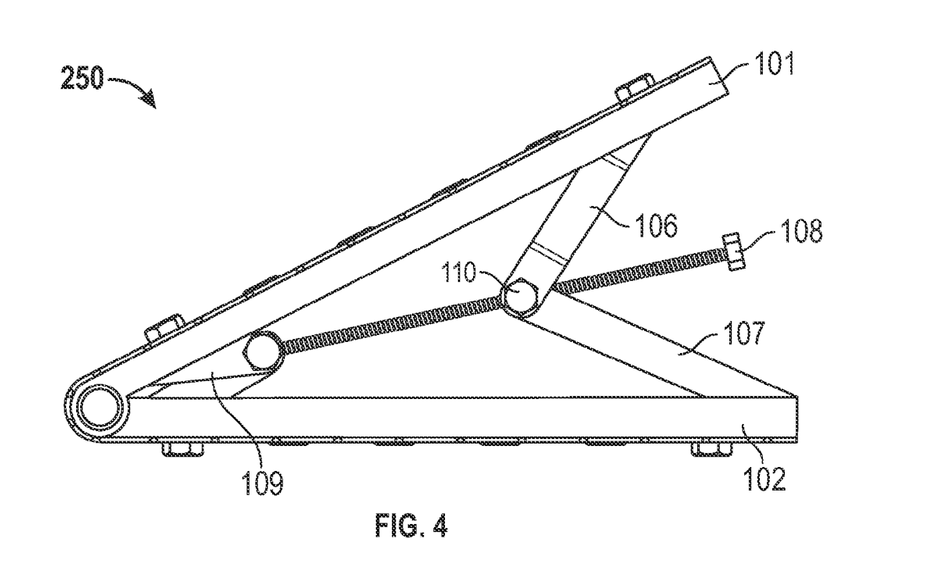
FIG. 4 illustrates an exemplary side elevation view of the traction jack in a partially opened position, in accordance with the disclosed embodiments.

FIG. 4 illustrates an exemplary side elevation view 250 of the traction jack in a partially opened position, in accordance with the disclosed embodiments. The first plate 101 is lowered towards the second plate 102 by turning the jack knob 108. The bolt 110 that connects the first extendable member 106 with the second extendable member 107 moves towards the jack hinge assembly 109.

Figure 5:
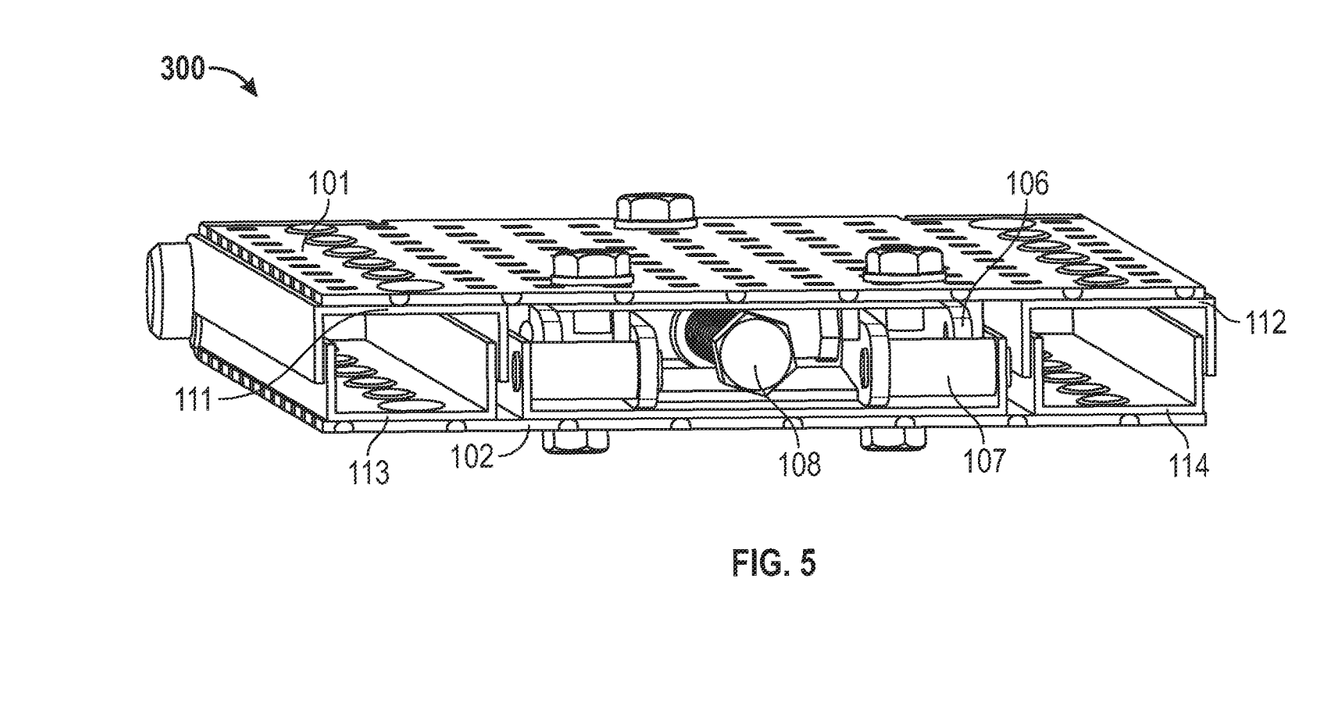
FIG. 5 illustrates an exemplary perspective view of the traction jack in a closed position, in accordance with the disclosed embodiments.

FIG. 5 illustrates an exemplary perspective view 300 of the traction jack in a closed position, in accordance with the disclosed embodiments. First plate 101 lies flat against second plate 102 when the jack knob 108 is turned. The channels 111, 112 in the first plate 101 fit within the channels 113, 114 in the second plate 102.

Figure 6:
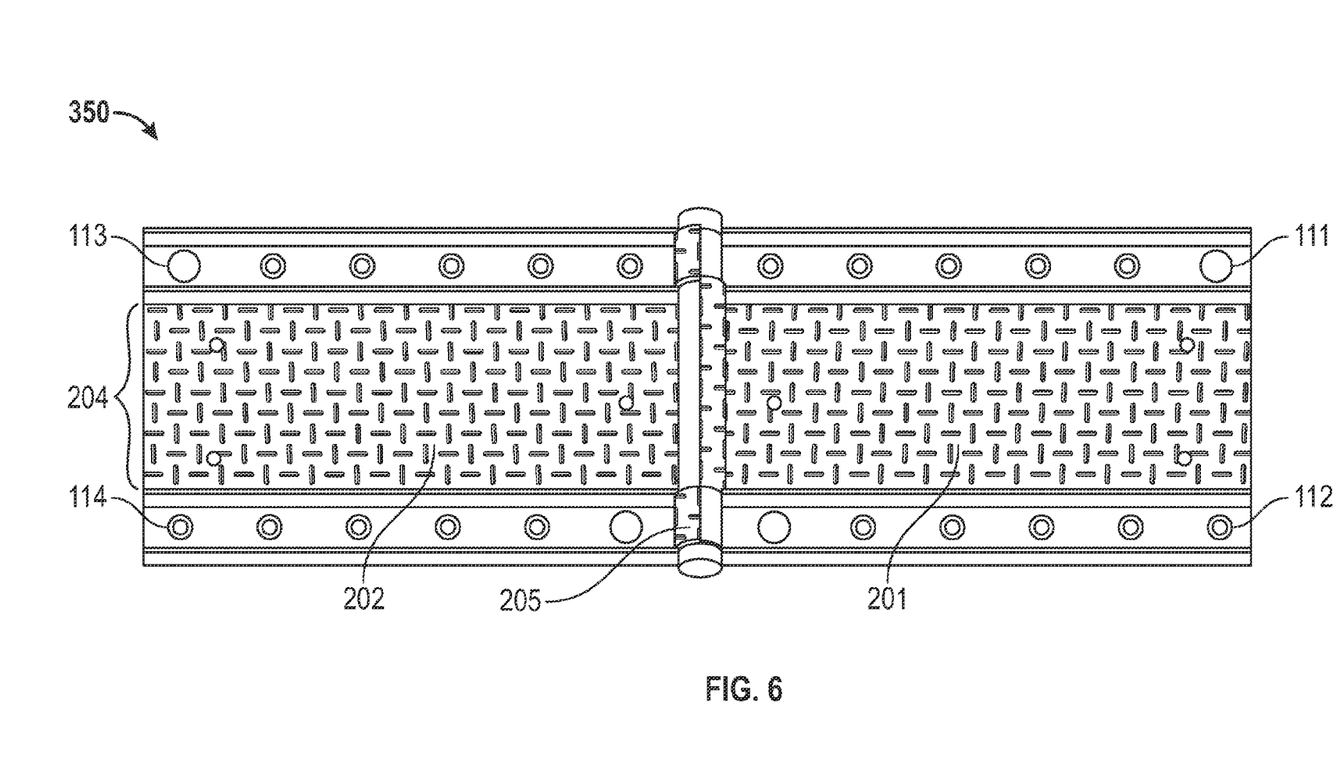
FIG. 6 illustrates an exemplary side elevation view of the traction jack in a fully opened position, in accordance with the disclosed embodiments.

FIG. 6 illustrates an exemplary side elevation view 350 of the traction jack in a fully opened position, in accordance with the disclosed embodiments. The fully opened vehicle traction jack can be used as a traction mat platform to provide additional traction for a vehicle's tire. When in the fully-opened position, the high-traction surfaces 204 of the first plate 201 and second plate 202 extend upward. The rounded edge 205 is fully extended to form an angle greater than or equal to 180°.

Figure 7:
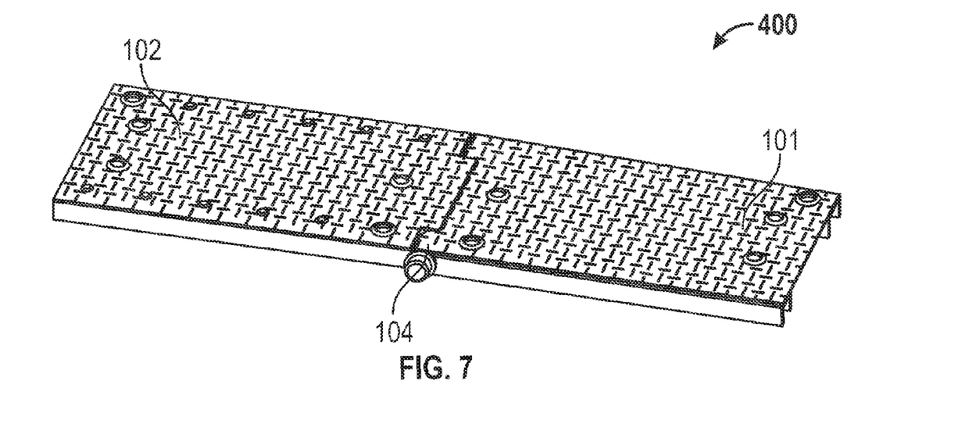
FIG. 7 illustrates an exemplary perspective view of the traction jack in a fully opened position, in accordance with the disclosed embodiments.

FIG. 7 illustrates an exemplary perspective view 400 of the traction jack in a fully opened position, in accordance with the disclosed embodiments. The fully opened vehicle traction jack can be used as a traction mat platform to provide additional traction for a vehicle's tire. When in the fully-opened position, the high-traction surfaces 104 of the first plate 101 and second plate 102 extend upward.

Figure 8:
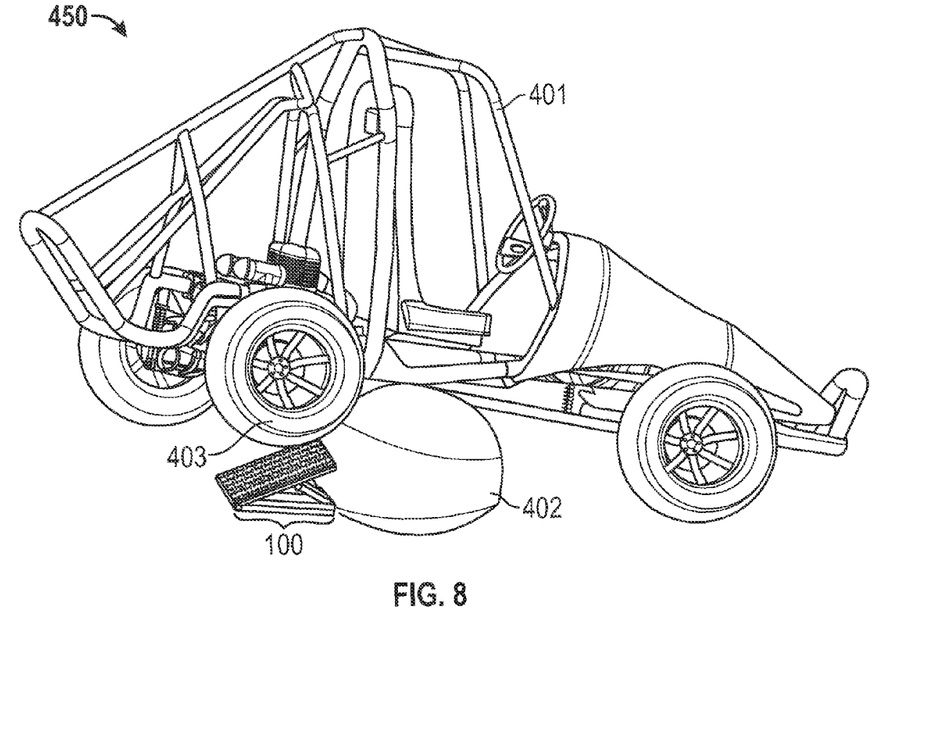
FIG. 8 illustrates an exemplary side elevation view of the traction jack in a partially opened position while supporting a vehicle, in accordance with the disclosed embodiments.

FIG. 8 illustrates an exemplary side elevation view 450 of the traction jack in a partially opened position while supporting a vehicle, in accordance with the disclosed embodiments. The traction jack embodiment 100 illustrated in FIG. 1 can be placed below a vehicle's 401 tire 403. The vehicle in this illustration is stuck on a rock 402. The disclosed embodiments 100 to 600 of the vehicle traction jack can adjust and reconfigure to perform different tasks, such as assisting in vehicle repair on underside of vehicle and rescuing vehicle from loose material on roadways and unpaved surfaces. The vehicle traction jack can free any type of vehicle including such as, for example, cars, trucks, sport utility vehicles ("SUVs"), all-terrain vehicles ("ATVs"), motorcycles, etc. Military vehicles may need a way to escape loose sand and dirt. Easily stored in a vehicle at all times, the lightweight vehicle traction jack can be used by only one person. Any number of disclosed vehicle traction jacks can be used at one time to dislodge a vehicle by placing the vehicle traction jack either in front of or behind a vehicle's tire.

Figure 9:
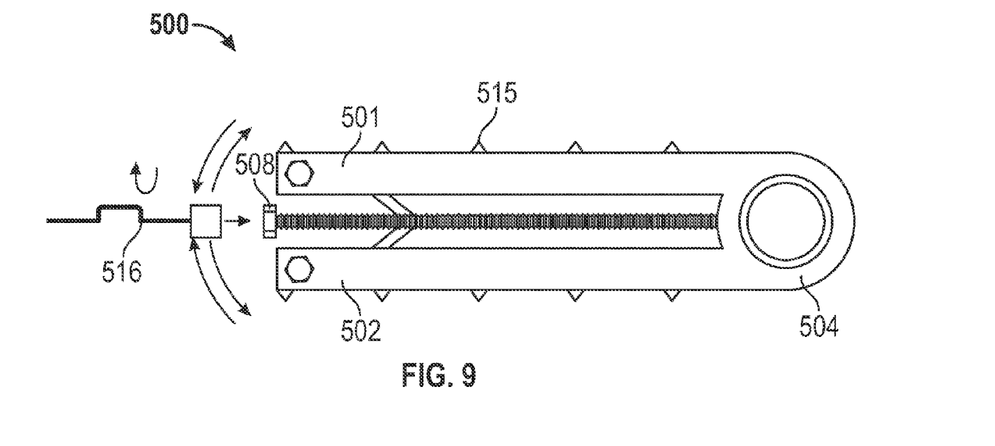
FIG. 9 illustrates an exemplary side elevation view of the traction jack in a closed position, in accordance with the disclosed embodiments.

FIG. 9 illustrates an exemplary side elevation view 500 of the traction jack in a closed position, in accordance with the disclosed embodiments. First plate 501 lies flat against second plate 502 when the jack knob 508 is turned using a hand crank 516 to turn the jack knob 508. The first plate 501 and second plate 502 are connected via a hinge 504. The first plate 501 and second plate 502 are covered in spikes 515 to lend traction.

Figure 10:
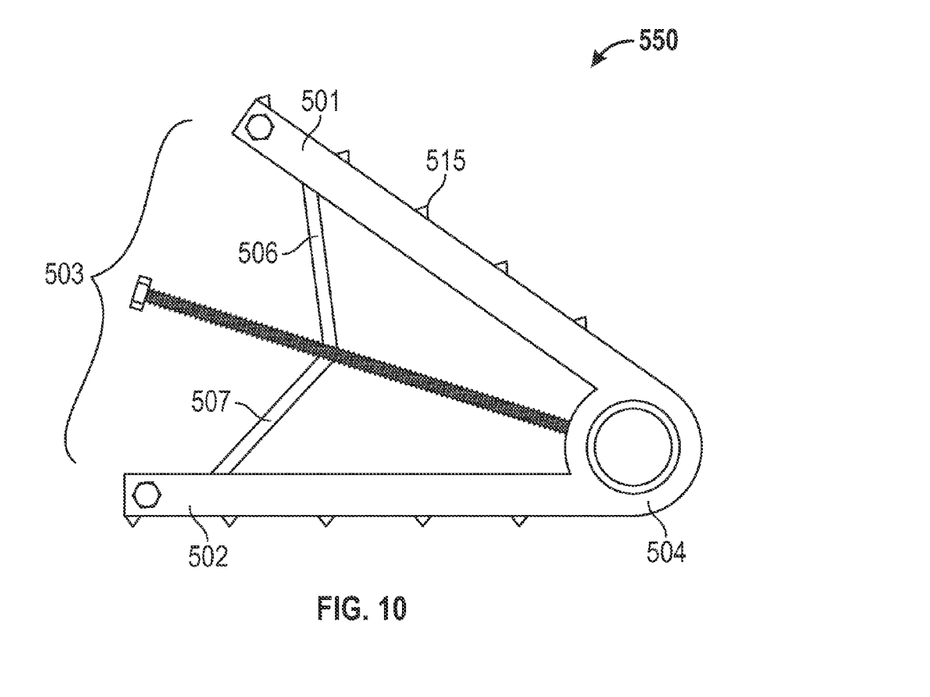
FIG. 10 illustrates an exemplary side elevation view of the traction jack in a partially opened position, in accordance with the disclosed embodiments.

FIG. 10 illustrates an exemplary side elevation view 550 of the traction jack in a partially opened position, in accordance with the disclosed embodiments. The jack 503 comprises a first extendable member 506, a second extendable member 507, and a jack knob 508. First plate 501 extends away from second plate 502 when the jack knob 508 is turned using a hand crank 516 to turn the jack knob 508. The first extendable member 506 and second extendable member 507 of the jack push the first plate 501 and second plate 502 away from each other to form a vehicle ramp.

Figure 11:
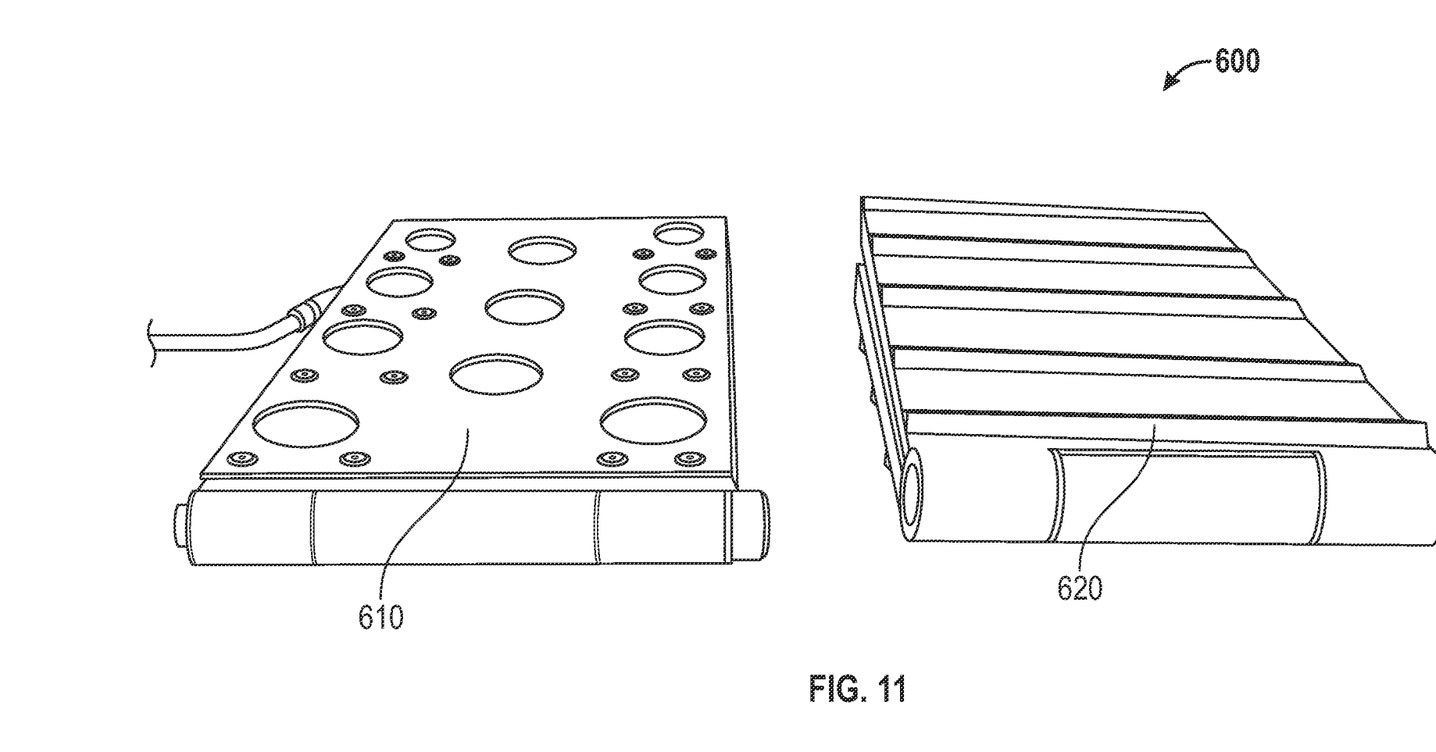
FIG. 11 illustrates an exemplary perspective view of the traction jack with various traction surfaces, in accordance with the disclosed embodiments.

FIG. 11 illustrates an exemplary perspective view 600 of the traction jack with various traction surfaces, in accordance with the disclosed embodiments. A metal surface with cut out holes for added traction is illustrated in 610. Raised spikes that extend along the width of the traction jack are illustrated in 620.

Based on the foregoing it can be appreciated that a number of different embodiments, preferred and alternative are disclosed herein. For example, in one embodiment, a traction jack apparatus can be implemented, which includes a first plate and a second plate attached to the first plate via a rounded hinge assembly wherein the rounded hinge assembly provides a rotational range of motion and articulated adjustability between the first plate and the second plate for positioning the traction jack between a vehicle's tire and a surface. Such an apparatus can also include a vehicle jack associated with the first plate and the second plate for extending an angle between the first plate and the second plate from a closed position to a partially-opened position or a fully-opened position, to provide a ramp to assist the vehicle's tire when the vehicle's tire is stuck on the surface. In some embodiments, the aforementioned surface can comprise a rut, hole, roadway condition, or weather condition.

In other embodiments, the first plate can include a rigid and rectangular surface capable of supporting the vehicle, wherein the first plate is covered in an anti-slip, high traction surface with a high coefficient of friction for frictional engagement with the vehicle's tire. In another embodiment, the second plate can include a rigid and rectangular surface capable of supporting the vehicle, wherein the second plate is covered in an anti-slip, high traction surface with a high coefficient of friction for frictional engagement with the vehicle's tire. In other embodiments, the first plate and the second plate can be formed from steel or aluminum.

In yet other embodiments, the partially-opened position of the first plate and the second plate can form an angle less than 180°. In still other embodiments, the fully-opened position of the first plate and the second plate can form an angle greater than or equal to 180°. In other embodiments, the vehicle jack associated with the first plate and the second plate is removable from the first plate and the second plate to a fully-opened position to provide a traction mat surface. In still other embodiments, the vehicle jack associated with the first plate and the second plate can comprise a first extendable member and a second extendable member, wherein the first extendable member is associated with the first plate and the second extendable member is associated with the second plate, and wherein the first extendable member and the second extendable member move towards the rounded hinge assembly to decrease an angle between the first plate and the second plate.

In another embodiment, the vehicle jack associated with the first plate and the second plate can include a first extendable member and a second extendable member, wherein the first extendable member is associated with the first plate and the second extendable member is associated with the second plate, and wherein the first extendable member and the second extendable member move away from the rounded hinge assembly to increase an angle between the first plate and the second plate.

In yet other embodiments, such an apparatus can include a first channel and a second channel associated with an underside of the first plate; and a third channel and a fourth channel associated with an underside of the second plate, wherein the first channel is sized to receive the third channel, and wherein the second channel is sized to receive the fourth channel to allow the first plate and the second plate to fit together when in a closed position.

In still another embodiment, a traction jack apparatus can include: a first plate; a second plate attached to the first plate via a rounded hinge assembly wherein the rounded hinge assembly provides a rotational range of motion and articulated adjustability between the first plate and the second plate for positioning the traction jack between a vehicle's tire and a surface; a vehicle jack associated with the first plate and the second plate for extending an angle between the first plate and the second plate from a closed position to a partially-opened position or a fully-opened position to provide a ramp to assist the vehicle's tire when the vehicle's tire is stuck on the surface; a first channel and a second channel associated with an underside of the first plate; and a third channel and a fourth channel associated with an underside of the second plate, wherein the first channel is sized to receive the third channel, and wherein the second channel is sized to receive the fourth channel to allow the first plate and the second plate to fit together when in a closed position.

In other embodiments, the first plate can comprise a rigid and rectangular metal surface capable of supporting the vehicle, wherein the first plate is covered in an anti-slip, high traction surface with a high coefficient of friction for frictional engagement with the vehicle's tire. In another embodiment, the second plate can include a rigid and rectangular metal surface capable of supporting the vehicle., wherein the second plate is covered in an anti-slip, high traction surface with a high coefficient of friction for frictional engagement with the vehicle's tire.

In yet other embodiments, the vehicle jack associated with the first plate and the second plate can include a first extendable member and a second extendable member, wherein the first extendable member is associated with the first plate and the second extendable member is associated with the second plate, and wherein the first extendable member and the second extendable member move away from the rounded hinge assembly to increase an angle between the first plate and the second plate, and move towards the rounded hinge assembly to decrease an angle between the first plate and the second plate. In still other embodiments, the vehicle jack associated with the first plate and the second plate is removable from the first plate and the second plate to a fully-opened position to provide a traction mat surface.

In another embodiment, a method for assisting a vehicle can be implemented. Such a method can include, in some embodiments, the steps of providing a traction jack device comprising a first plate covered in a high-traction material, a second plate covered in a high-traction material, a rounded hinge assembly associated with the first plate and the second plate, wherein the rounded hinge assembly provides a rotational range of motion and articulated adjustability between the first plate and the second plate for positioning the traction jack device between a vehicle's tire and a surface, and a vehicle jack associated with the first plate and the second plate; and extending the vehicle jack attached to the first plate and the second plate to form an angled vehicle ramp to provide a high-traction, ramped surface to assist a tire of the vehicle.

In another embodiment, a step can be implemented for extending the vehicle jack from a closed position to a partially opened position comprising an angle less than 180° between the first plate and the second plate, or a fully-opened position comprising an angle equal to or greater than 180° between the first plate and the second plate. In still another embodiment, a step can be implemented for removing the vehicle jack associated with the first plate and the second plate from the first plate and the second plate to a fully-opened position to provide a traction mat surface.

In yet another embodiment, steps can be implemented for moving a first extendable member associated with the rounded hinge assembly and the first plate, and a second extendable member associated with the rounded hinge assembly and the second plate towards the rounded hinge assembly to decrease an angle between the first plate and the second plate; and moving the first extendable member associated with the rounded hinge assembly and the first plate, and the second extendable member associated with the rounded hinge assembly and the second plate away from the rounded hinge assembly to increase the angle between the first plate and the second plate.

It will be appreciated that variations of the above-disclosed and other features and functions, or alternatives thereof, may be desirably combined into many other different systems or applications. Furthermore, various presently unforeseen or unanticipated alternatives, modifications, variations or improvements therein may be subsequently made by those skilled in the art, which are also intended to be encompassed by the following claims.

The invention claimed is:

1. A traction jack apparatus, comprising:
   a first plate, wherein said first plate comprises a rigid and rectangular surface capable of supporting said vehicle, wherein said first plate is permanently covered in an anti-slip, high traction surface with a high coefficient of friction for frictional engagement with said tire of said vehicle;
   a second plate attached to said first plate via a rounded hinge assembly wherein said rounded hinge assembly provides a rotational range of motion and articulated adjustability between said first plate and said second plate for positioning said traction jack between a tire of a vehicle tire and a surface; and
   a vehicle jack attached to said first plate and said second plate, wherein said vehicle jack contacts a surface of said second plate when said vehicle jack is extended, wherein said vehicle jack extends an angle between said first plate and said second plate from a closed position to a partially-opened position or a fully-opened position to provide a ramp to assist said tire of said vehicle when said tire of said vehicle is stuck on said surface.

2. The apparatus of claim 1 wherein said surface comprises a rut, hole, roadway condition, or weather condition.

3. The apparatus of claim 1 wherein said first plate comprises a rigid and rectangular surface capable of supporting said vehicle, wherein said first plate is covered in an anti-slip, high traction surface with a high coefficient of friction for frictional engagement with said tire of said vehicle.

4. The apparatus of claim 1 wherein said second plate comprises a rigid and rectangular surface capable of supporting said vehicle, wherein said second plate is covered in an anti-slip, high traction surface with a high coefficient of friction for frictional engagement with said tire of said vehicle.

5. The apparatus of claim 1 wherein said first plate and said second plate comprise of steel or aluminum.

6. The apparatus of claim 1 wherein said partially-opened position of said first plate and said second plate forms an angle less than 180°.

7. The apparatus of claim 1 wherein said fully-opened position of said first plate and said second plate forms an angle greater than or equal to 180°.

8. The apparatus of claim 1 wherein said vehicle jack associated with said first plate and said second plate is removable from said first plate and said second plate to a fully-opened position to provide a traction mat surface.

9. The apparatus of claim 1 wherein said vehicle jack associated with said first plate and said second plate comprises a first extendable member and a second extendable member, wherein said first extendable member is associated with said first plate and said second extendable member is associated with said second plate, and wherein said first extendable member and said second extendable member move towards said rounded hinge assembly to decrease an angle between said first plate and said second plate.

10. The apparatus of claim 1 wherein said vehicle jack associated with said first plate and said second plate comprises a first extendable member and a second extendable member, wherein said first extendable member is associated with said first plate and said second extendable member is associated with said second plate, and wherein said first extendable member and said second extendable member move away from said rounded hinge assembly to increase an angle between said first plate and said second plate.

11. The apparatus of claim 1 further comprising:
a first channel and a second channel associated with an underside of said first plate;
a third channel and a fourth channel associated with an underside of said second plate, wherein said first channel is sized to receive said third channel, and wherein said second channel is sized to receive said fourth channel to allow said first plate and said second plate to fit together when in a closed position.

12. A traction jack apparatus, comprising:
a first plate, wherein said first plate comprises a rigid and rectangular surface capable of supporting said vehicle, wherein said first plate is permanently covered in an anti-slip, high traction surface with a high coefficient of friction for frictional engagement with said tire of said vehicle;
a second plate attached to said first plate via a rounded hinge assembly wherein said rounded hinge assembly provides a rotational range of motion and articulated adjustability between said first plate and said second plate for positioning said traction jack between a tire of said vehicle and a surface;
a vehicle jack attached to said first plate and said second plate, wherein said vehicle jack contacts a surface of said second plate when said vehicle jack is extended, wherein said vehicle lack extends an angle between said first plate and said second plate from a closed position to a partially-opened position or a fully-opened position to provide a ramp to assist said tire of said vehicle when said tire of a vehicle is stuck on said surface;
a first channel and a second channel associated with an underside of said first plate; and
a third channel and a fourth channel associated with an underside of said second plate, wherein said first channel is sized to receive said third channel, and wherein said second channel is sized to receive said fourth channel to allow said first plate and said second plate to fit together when in a closed position.

13. The apparatus of claim 12 wherein said first plate comprises a rigid and rectangular metal surface capable of supporting said vehicle, wherein said first plate is covered in an anti-slip, high traction surface with a high coefficient of friction for frictional engagement with said tire of said vehicle.

14. The apparatus of claim 12 wherein said second plate comprises a rigid and rectangular metal surface capable of supporting said vehicle, wherein said second plate is covered in an anti-slip, high traction surface with a high coefficient of friction for frictional engagement with said tire of said vehicle.

15. The apparatus of claim 12 wherein said vehicle jack associated with said first plate and said second plate comprises a first extendable member and a second extendable member, wherein said first extendable member is associated with said first plate and said second extendable member is associated with said second plate, and wherein said first extendable member and said second extendable member move away from said rounded hinge assembly to increase an angle between said first plate and said second plate, and move towards said rounded hinge assembly to decrease an angle between said first plate and said second plate.

16. The apparatus of claim 12 wherein said vehicle jack associated with said first plate and said second plate is removable from said first plate and said second plate to a fully-opened position to provide a traction mat surface.

17. A method for assisting a vehicle, comprising:
providing a traction jack device comprising a first plate covered in a high-traction material, wherein said first plate comprises a rigid and rectangular surface capable of supporting said vehicle, wherein said first plate is permanently covered in an anti-slip, high traction surface with a high coefficient of friction for frictional engagement with said tire of said vehicle a second plate covered in a high-traction material, a rounded hinge assembly associated with said first plate and said second plate, wherein said rounded hinge assembly provides a rotational range of motion and articulated adjustability between said first plate and said second plate for positioning said traction jack device between a tire of said vehicle and a surface, and a vehicle jack attached to said first plate and said second plate wherein said vehicle lack contacts a surface of said second plate when said vehicle lack is extended, wherein said vehicle jack extends; and
extending said vehicle jack attached to said first plate and said second plate to form an angled vehicle ramp to provide a high-traction, ramped surface to assist a tire of said vehicle.

18. The method of claim 17 further comprising extending said vehicle jack from a closed position to a partially opened position comprising an angle less than 180° between said first plate and said second plate, or a fully-opened position comprising an angle equal to or greater than 180° between said first plate and said second plate.

19. The method of claim 17 further comprising removing said vehicle jack associated with said first plate and said second plate from said first plate and said second plate to a fully-opened position to provide a traction mat surface.

20. The method of claim 17 further comprising:
moving a first extendable member associated with said rounded hinge assembly and said first plate, and a second extendable member associated with said rounded hinge assembly and said second plate towards said rounded hinge assembly to decrease an angle between said first plate and said second plate; and
moving said first extendable member associated with said rounded hinge assembly and said first plate, and said second extendable member associated with said rounded hinge assembly and said second plate away from said rounded hinge assembly to increase said angle between said first plate and said second plate.

* * * * *